US012794403B2

(12) United States Patent
Sable et al.

(10) Patent No.: US 12,794,403 B2
(45) Date of Patent: Nov. 10, 2026

(54) SUPPORT STRUCTURES FOR SOLAR TRACKERS

(71) Applicant: Nextpower LLC, Fremont, CA (US)

(72) Inventors: Abhimanyu Anil Sable, Hyderabad (IN); Alexander W. Au, Oakland, CA (US); Ashwajit Wahane, Kalyan (IN); Phani Kumar, Hyderabad (IN); Ricardo Delgado-Nanez, San Jose, CA (US)

(73) Assignee: Nextpower LLC, Fremont, CA (US)

( * ) Notice: Subject to any disclaimer, the term of this patent is extended or adjusted under 35 U.S.C. 154(b) by 170 days.

(21) Appl. No.: 18/662,307

(22) Filed: May 13, 2024

(65) Prior Publication Data

US 2024/0388242 A1 Nov. 21, 2024

Related U.S. Application Data

(60) Provisional application No. 63/466,980, filed on May 16, 2023.

(51) Int. Cl.
*H02S 20/32* (2014.01)
*E02D 5/52* (2006.01)
*F24S 25/12* (2018.01)
*F24S 30/425* (2018.01)

(52) U.S. Cl.
CPC .............. *H02S 20/32* (2014.12); *E02D 5/523* (2013.01); *F24S 25/12* (2018.05); *F24S 30/425* (2018.05)

(58) Field of Classification Search
None
See application file for complete search history.

(56) References Cited

U.S. PATENT DOCUMENTS

| | | | | |
|---|---|---|---|---|
| 2020/0072505 | A1* | 3/2020 | Hudson | H02S 20/10 |
| 2020/0076354 | A1* | 3/2020 | West | H02S 20/32 |
| 2020/0116394 | A1* | 4/2020 | West | F24S 25/617 |
| 2020/0256586 | A1 | 8/2020 | West et al. | |
| 2020/0313602 | A1* | 10/2020 | West | H02S 20/32 |
| 2021/0013828 | A1* | 1/2021 | Hudson | H02S 20/32 |
| 2021/0017729 | A1* | 1/2021 | Karkheck | E02D 5/805 |
| 2021/0018225 | A1* | 1/2021 | Hudson | F24S 25/617 |
| 2021/0257964 | A1 | 8/2021 | Hudson et al. | |
| 2022/0085753 | A1 | 3/2022 | Kumar et al. | |
| 2023/0054140 | A1* | 2/2023 | Hudson | F24S 30/425 |

FOREIGN PATENT DOCUMENTS

| | | | | |
|---|---|---|---|---|
| WO | 2023060314 A1 | | 4/2023 | |
| WO | WO-2023060315 A1 | * | 4/2023 | E02D 27/32 |

OTHER PUBLICATIONS

International Searching Authority "International Search Report and Written Opinion" From Application No. PCT/US2024/029086, Dated Oct. 15, 2024, pp. 20.

International Searching Authority "Partial Search Report and Invitation to Pay Fees" From Application No. PCT/US2024/029086, Dated Aug. 20, 2024, pp. 12.

* cited by examiner

*Primary Examiner* — Steven M Marsh
(74) *Attorney, Agent, or Firm* — Fredrikson & Byron, P.A.

(57) ABSTRACT

A pier for a solar tracking system includes a bearing housing assembly and a frame defining a A-shaped profile having a pair of legs and a crown interposed between the pair of legs, the frame including a pivot disposed on the crown and extending between the pair of legs, the pivot configured to support the bearing housing assembly.

20 Claims, 12 Drawing Sheets

SUPPORT STRUCTURES FOR SOLAR TRACKERS

RELATED APPLICATIONS

This application claims the benefit of U.S. Provisional Patent Application No. 63/466,980, filed May 16, 2023, the entire contents of which are incorporated herein by reference.

FIELD

The present disclosure relates to solar power generation systems, and more particularly, to support structures for solar arrays within a solar tracking system.

BACKGROUND OF RELATED ART

One of the most significant, costly, and time-consuming aspects relating to the manufacture and installation of solar trackers is the use of piers to support the solar modules. These piers, typically C-channels, W-channels, I-beams, or the like, are driven deep into the ground using costly heavy machinery such as pile driving equipment or by casting the piers in-situ using costly micro-pile equipment. As can be appreciated, each process not only requires costly equipment, but also requires a significant amount of time to complete, driving up the cost of installing solar tracking systems.

Additionally, solar tracker systems employ a significant amount of bearing housing assemblies, piers, damper assemblies, amongst others. As can be appreciated, the enormous number of these assemblies required to construct a solar tracking system requires a significant amount of material and takes a significant amount of time to install, further driving up the cost of installing solar tracking systems.

In view of these costly processes and designs, solar tracker piers and foundations that alleviate the need for costly and time-consuming processes involving heavy machinery and reduce the amount of material and labor required for installation are needed.

SUMMARY

In accordance with an aspect of the present disclosure, a pier for a solar tracking system includes a bearing housing assembly and a frame, the frame defining a A-shaped profile having a pair of legs and a crown interposed between the pair of legs, the frame including a pivot disposed on the crown and extending between the pair of legs, the pivot configured to rotatably support the bearing housing assembly.

In aspects, the crown may define a planar portion extending between the pair of legs.

In certain aspects, the pivot may include a bushing to rotatably support the bearing housing assembly.

In other aspects, the bearing housing assembly may include a support bracket rotatably supported on the pivot and a torque tube clamp operably coupled to the support bracket, the torque tube clamp configured to couple a torque tube to the bearing housing assembly.

In certain aspects, the support bracket and the torque tube clamp may cooperate to define a channel for receipt of a torque tube.

In aspects, the channel may be disposed within a space bounded by the crown and the pair of legs of the frame.

In accordance with another aspect of the present disclosure, a pier for a solar tracking system includes a frame, the frame defining a A-shaped profile having a pair of legs and a crown interposed between the pair of legs, and a damper support configured to support a damper, the damper support including a center portion extending between a first end portion and a second, opposite end portion, a first coupling disposed on the first end portion, the first coupling configured to be operably coupled to a first leg of the pair of legs of the frame, and a second coupling disposed on the second end portion, the second coupling configured to be operably coupled to a second leg of the pair of legs of the frame.

In certain aspects, the damper support may define a U-shaped profile the center portion including a first elbow interposed between the first end portion and the first coupling and a second elbow interposed between the second end portion and the second coupling.

In aspects, each of the first coupling and the second coupling may define a U-shaped profile defining a channel for receipt of a leg of the pair of legs of the frame.

In other aspects, the channel of each of the first and second couplings may be oriented at an angle relative to the center portion, the angle being complimentary to an angle defined by the pair of legs relative to the crown.

In aspects, the center portion of the damper support may be offset from the pair of legs of the frame.

In certain aspects, the pier may include a bearing housing assembly operably coupled to the crown of the frame.

In aspects, the pier may include a support bracket coupled to the crown of the frame and supporting the bearing housing assembly.

In accordance with another aspect of the present disclosure, a pier for a solar tracking system includes a frame, the frame defining a A-shaped profile having a pair of legs and a crown interposed between the pair of legs, and a damper support, the damper support defining a triangular profile defining a first apex, a second apex, and a third apex, wherein the first apex and the second apex are operably coupled to a leg of the pair of legs and the third apex includes a pivot for rotatably supporting a damper, the damper support defining a hollow interior portion bounded by the first, second, and third apexes.

In aspects, the damper support may include a first clamp assembly disposed on the first apex and a second clamp assembly disposed on the second apex, the first clamp assembly defining a first channel for receipt of the leg and the second clamp assembly defining a second channel for receipt of the leg, the first clamp assembly and the second clamp assembly configured to selectively secure the damper support to the leg of the pair of legs of the frame.

In other aspects, a protuberance may be defined on an inner surface of the first channel of the first clamp that is configured to be received within a bore defined through the leg of the frame.

In certain aspects, the damper support may define a first leg extending between the first apex and the third apex and a second leg extending between the second apex and the third apex, the first leg and the second leg cooperating to define an inner surface bounding the hollow interior portion.

In other aspects, the damper support may include a web disposed on a portion of the inner surface bounding the hollow interior portion.

In aspects, the damper support may define a third leg extending between the first apex and the second apex, the first leg, the second leg, and the third leg cooperating to define the inner surface bounding the hollow interior portion.

In certain aspects, the pier may include a second damper support defining a triangular profile defining a first apex, a second apex, and a third apex, wherein the first apex and the second apex are operably coupled to a second leg of the pair of legs and the third apex includes a pivot for rotatably supporting a second damper, the second damper support defining a hollow interior portion bounded by the first, second, and third apexes of the second damper support.

BRIEF DESCRIPTION OF THE DRAWINGS

Various aspects and features of the present disclosure are described hereinbelow with reference to the drawings, wherein.

DETAILED DESCRIPTION

Figure 1:
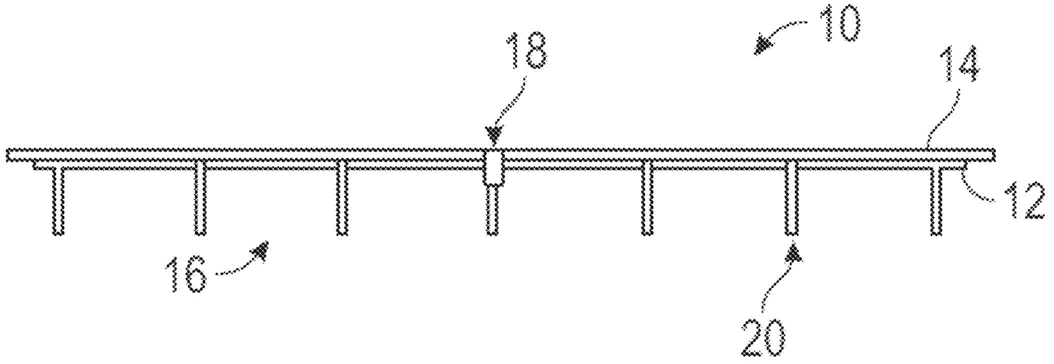
FIG. 1 is an elevation view of a solar tracker provided in accordance with the present disclosure.
Figure 2:
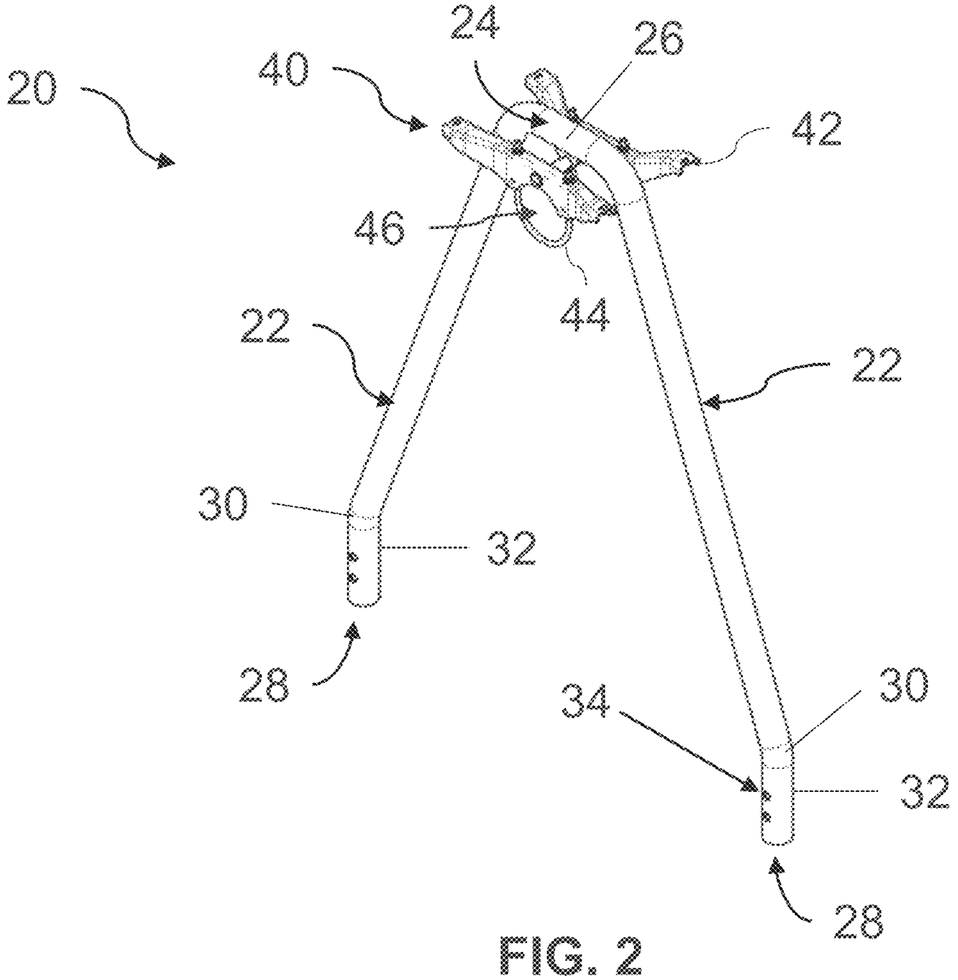
FIG. 2 is a perspective view of a pier of the solar tracker of FIG. 1 shown coupled to a bearing housing assembly of the solar tracker of FIG. 1.
Figure 3:
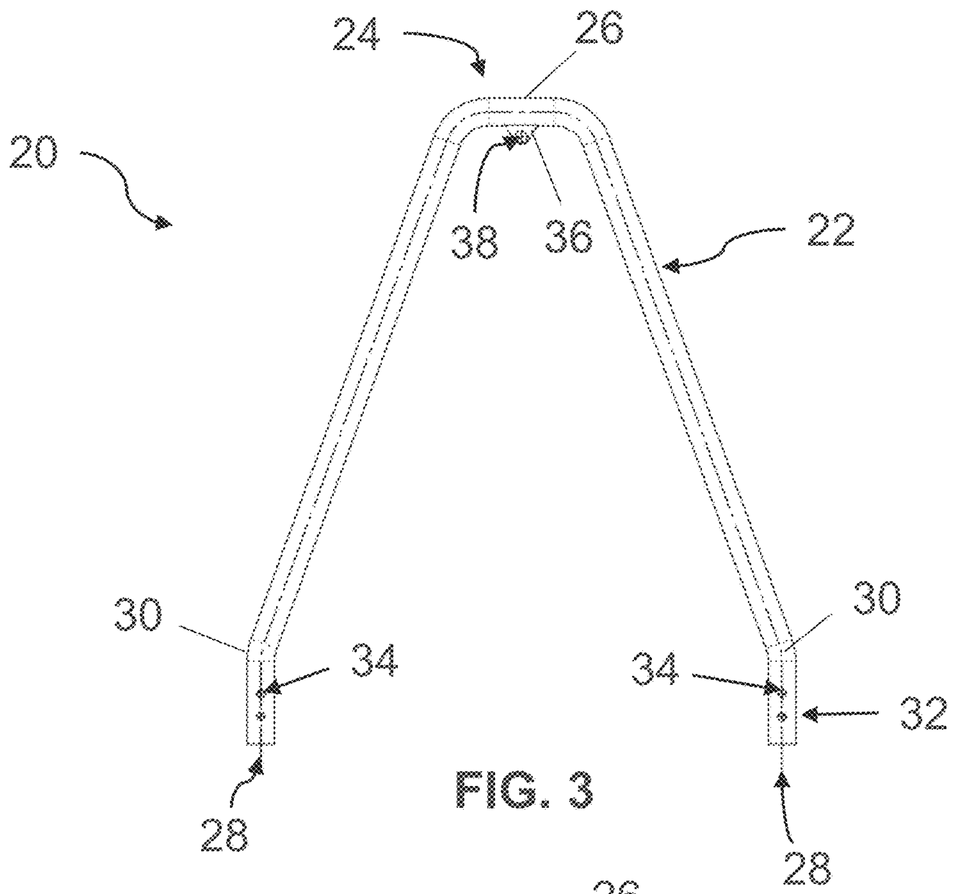
FIG. 3 is a front elevation view of the pier of FIG. 2.
Figure 4:
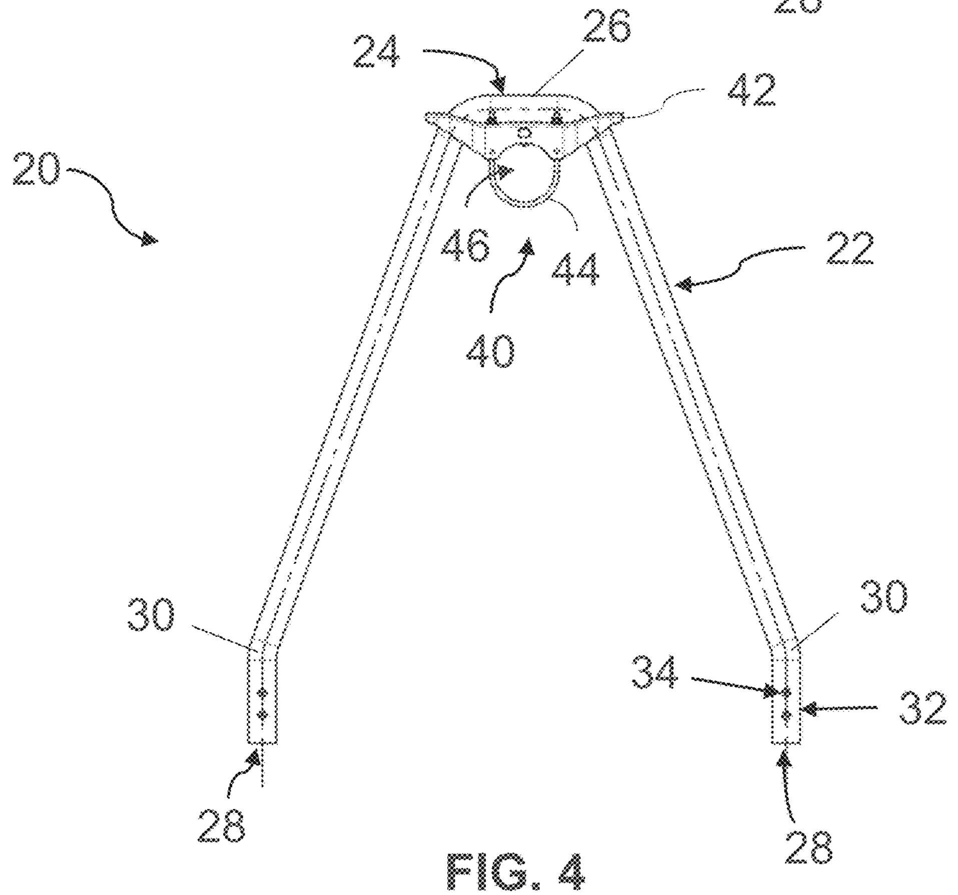
FIG. 4 is a front elevation view of the pier of FIG. 2 shown coupled to the bearing housing assembly of FIG. 2.
Figure 6:
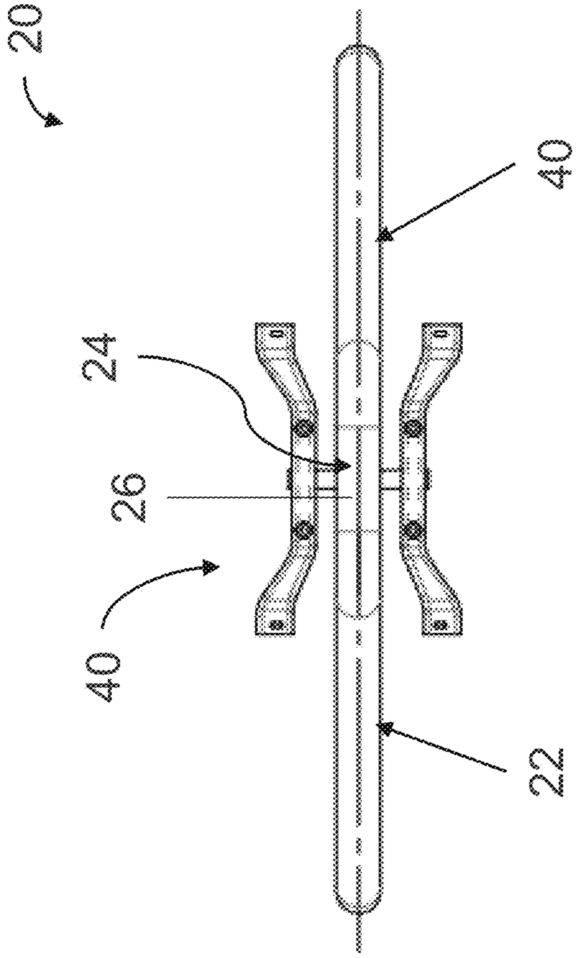
FIG. 6 is a plan view of the pier of FIG. 2 shown coupled to the bearing housing assembly of FIG. 2.
Figure 5:
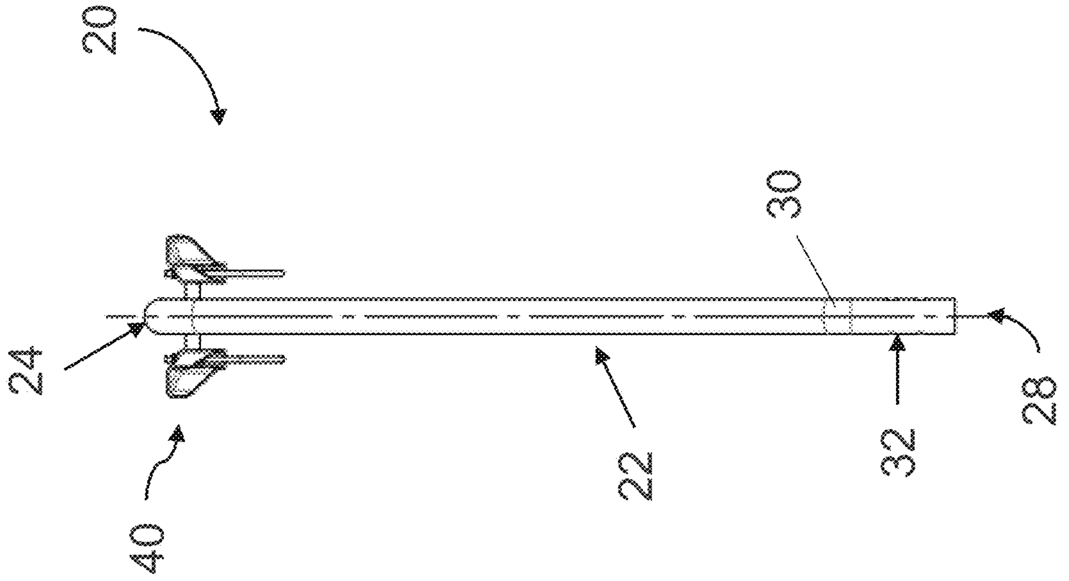
FIG. 5 is a side elevation view of the pier of FIG. 2 shown coupled to the bearing housing assembly of FIG. 2.
Figure 7:
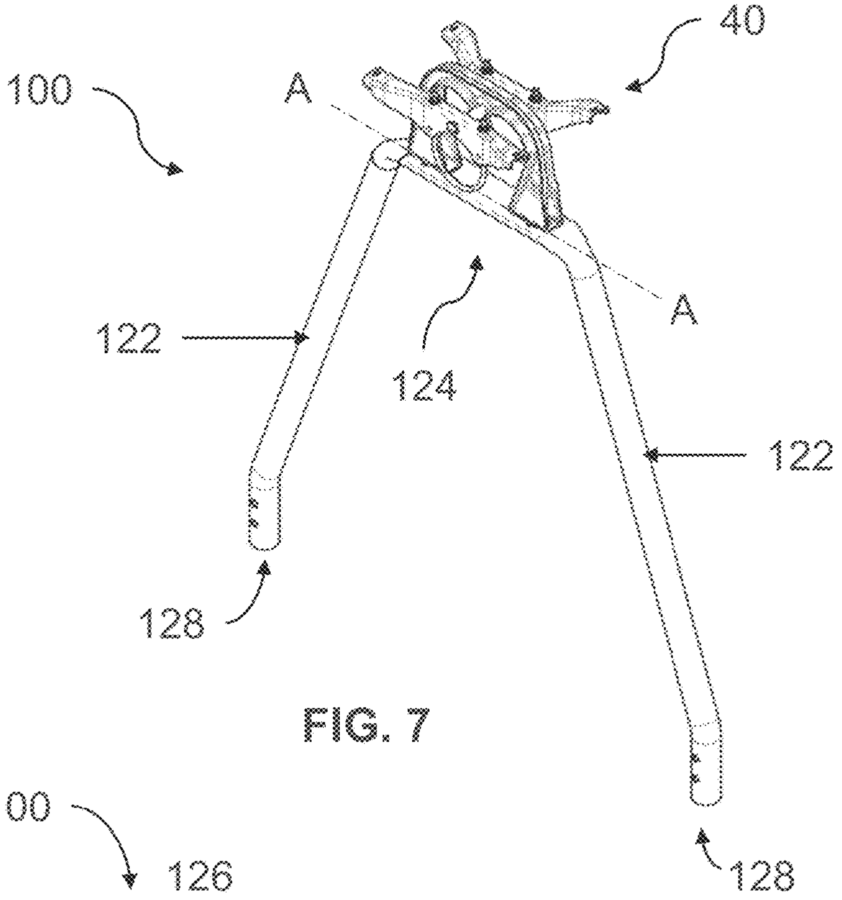
FIG. 7 is a perspective view of an alternate embodiment of a pier of the solar tracker of FIG. 1 shown coupled to an alternate embodiment of a bearing housing assembly of the solar tracker of FIG. 1 provided in accordance with the present disclosure.
Figure 8:
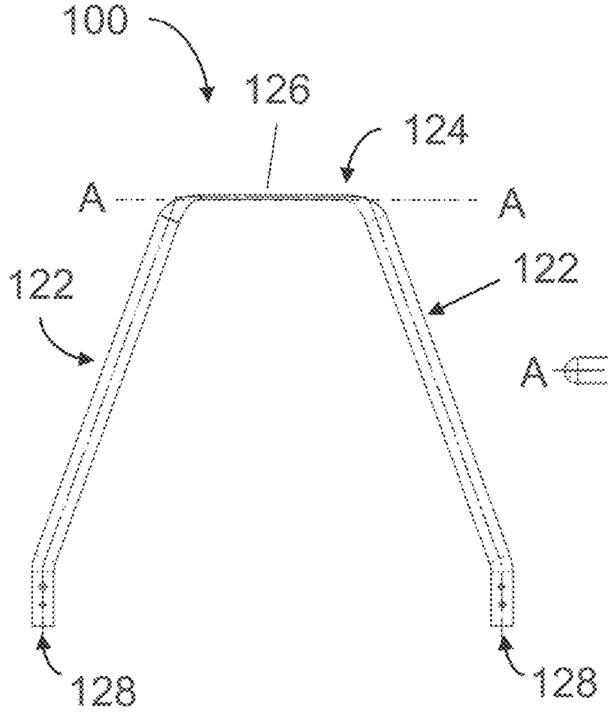
FIG. 8 is a front elevation view of the pier of FIG. 7.
Figure 9:
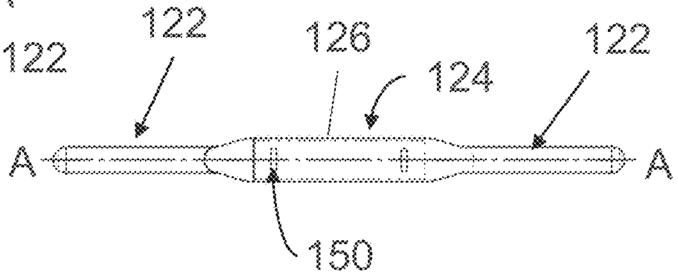
FIG. 9 is a plan view of the pier of FIG. 7.
Figure 12:
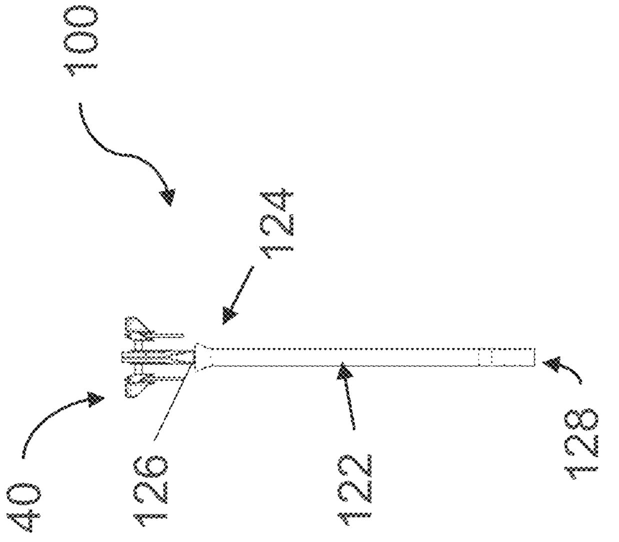
FIG. 12 is a side elevation view of the pier of FIG. 7 shown coupled to the bearing housing assembly of FIG. 7.
Figure 13:
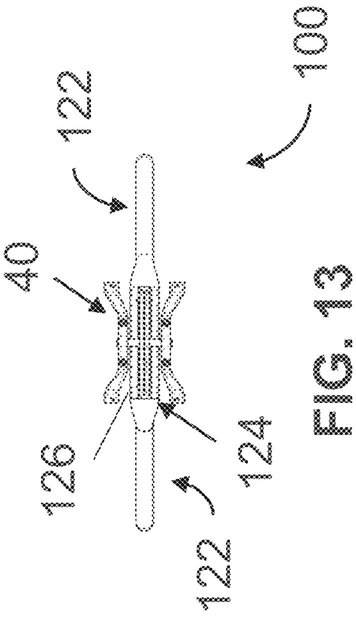
FIG. 13 is a plan view of the pier of FIG. 7 shown coupled to the bearing housing assembly of FIG. 7.
Figure 11:
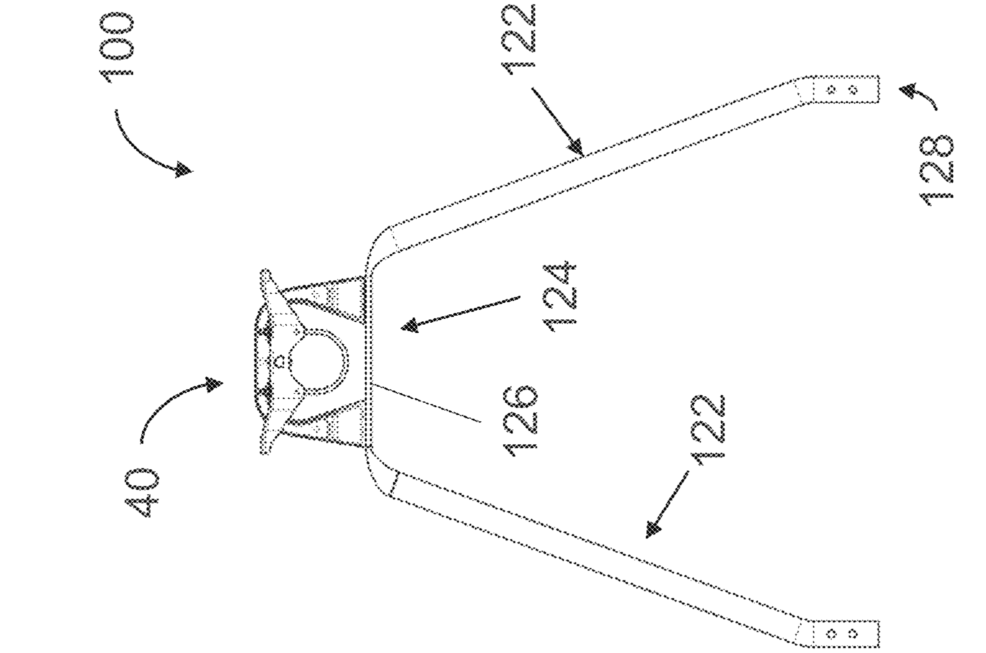
FIG. 11 is a front elevation view of the pier of FIG. 7 shown coupled to the bearing housing assembly of FIG. 7.
Figure 10:
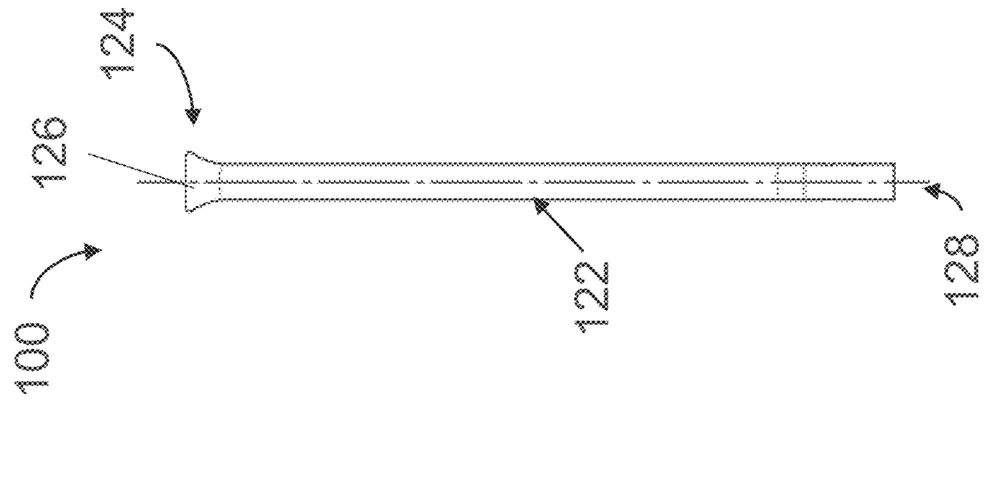
FIG. 10 is a side elevation view of the pier of FIG. 7.
Figure 14:
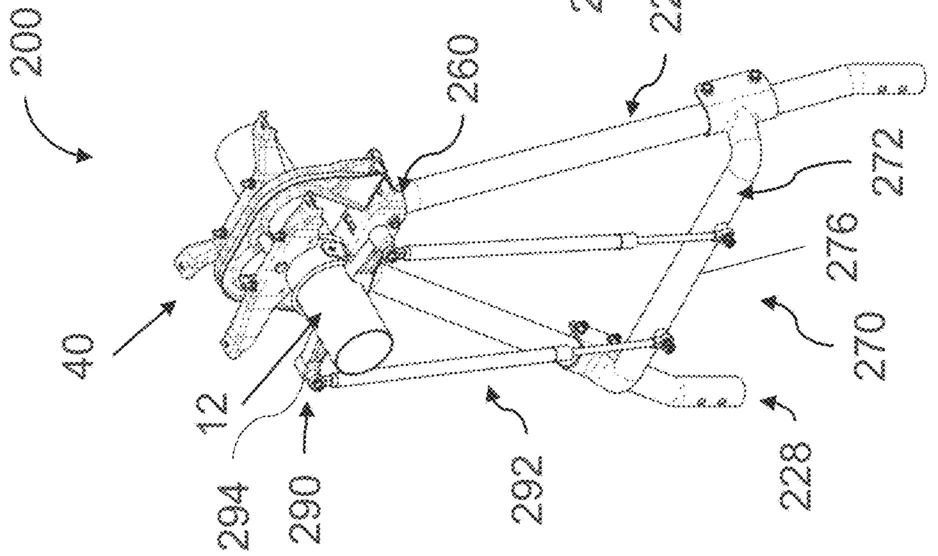
FIG. 14 is a perspective view of another embodiment of a pier of the solar tracker of FIG. 1 shown coupled the bearing housing assembly of FIG. 7 and a damper assembly provided in accordance with the present disclosure.
Figure 15:
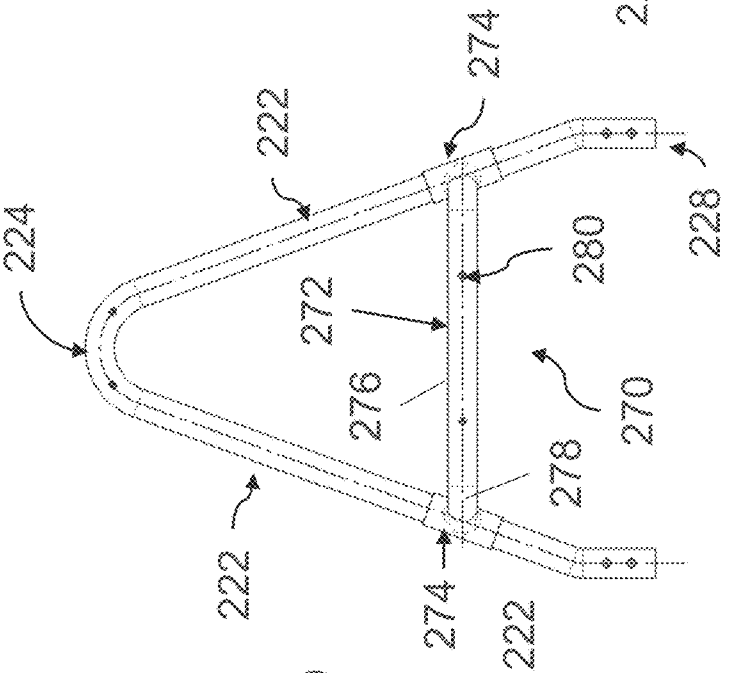
FIG. 15 is a front elevation view of the pier of FIG. 14.
Figure 16:
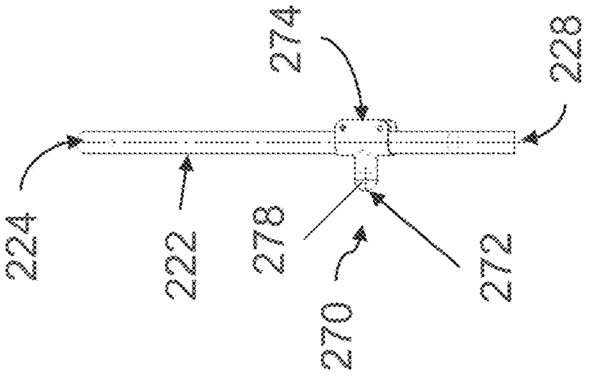
FIG. 16 is a side elevation view of the pier of FIG. 14.
Figure 17:
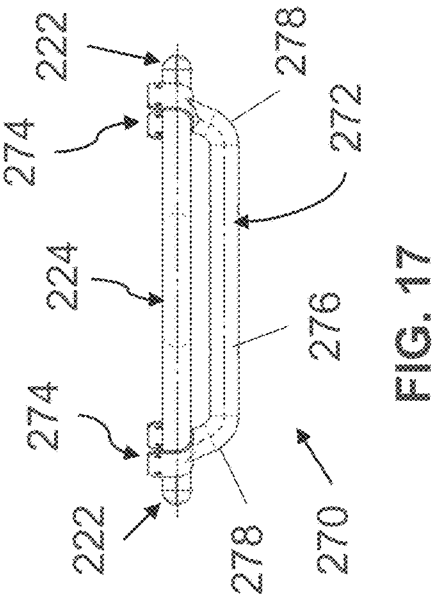
FIG. 17 is a plan view of the pier of FIG. 14.
Figure 18:
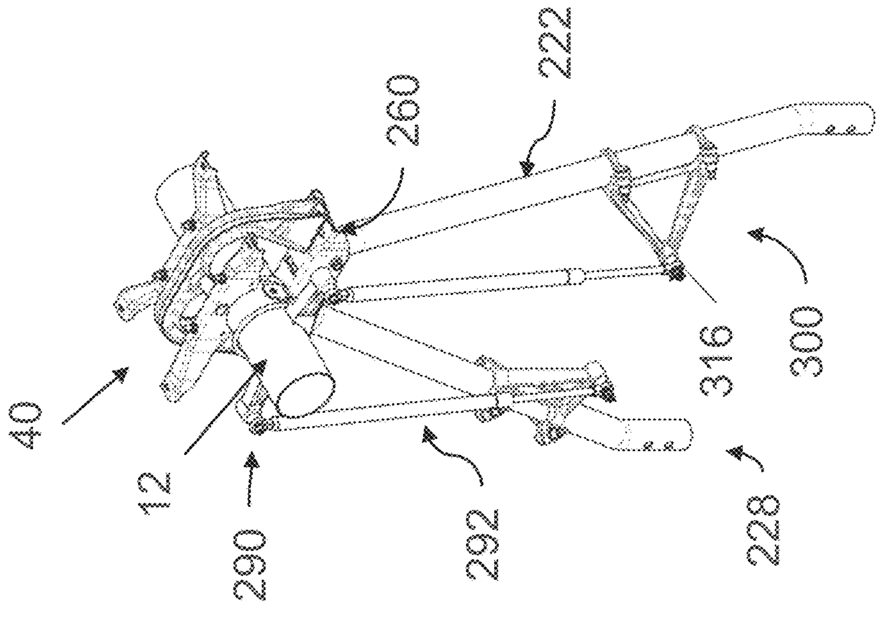
FIG. 18 is a perspective view of the pier of FIG. 2 shown coupled to the bearing housing assembly of FIG. 7 and another embodiment of the damper assembly of FIG. 14.
Figure 19:
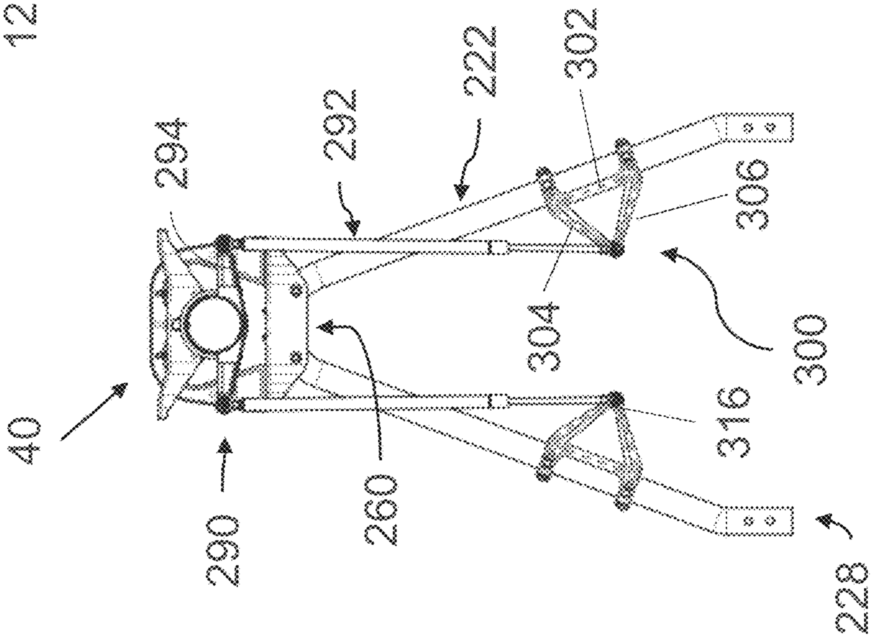
FIG. 19 is a front elevation view of the pier, bearing housing assembly, and damper assembly of FIG. 18.
Figure 20:
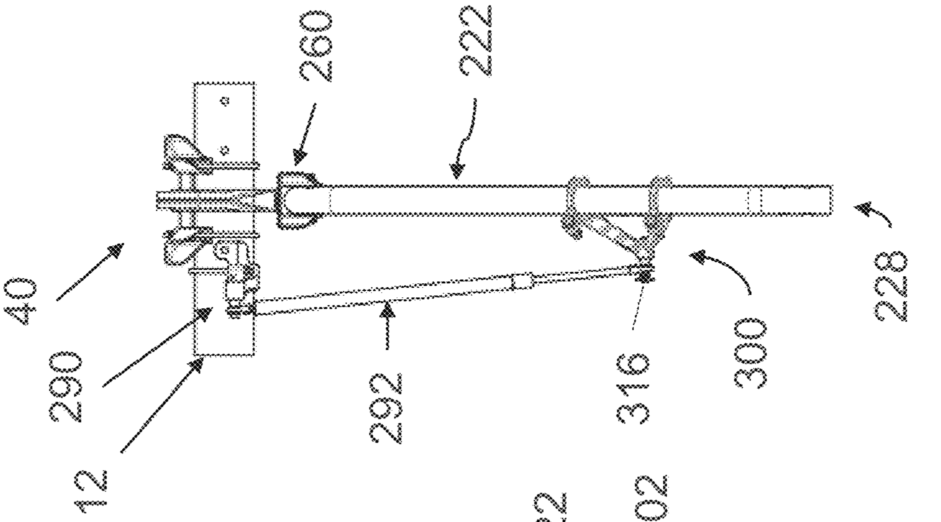
FIG. 20 is a side elevation view of the pier, bearing housing assembly, and damper assembly of FIG. 18.
Figure 21:
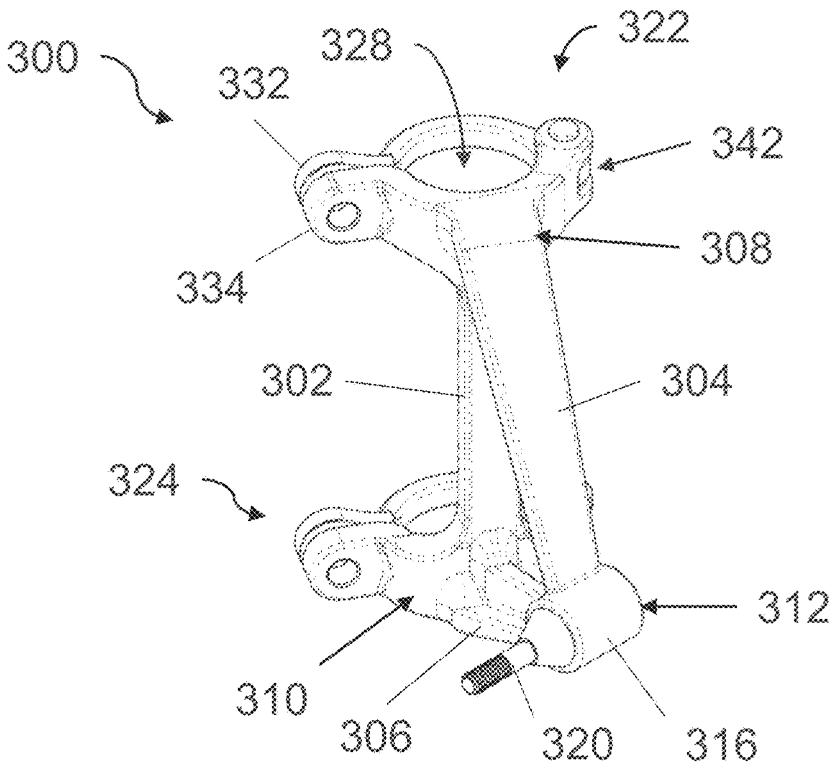
FIG. 21 is a perspective view of a lower damper mount of the damper assembly of FIG. 18.
Figure 22:
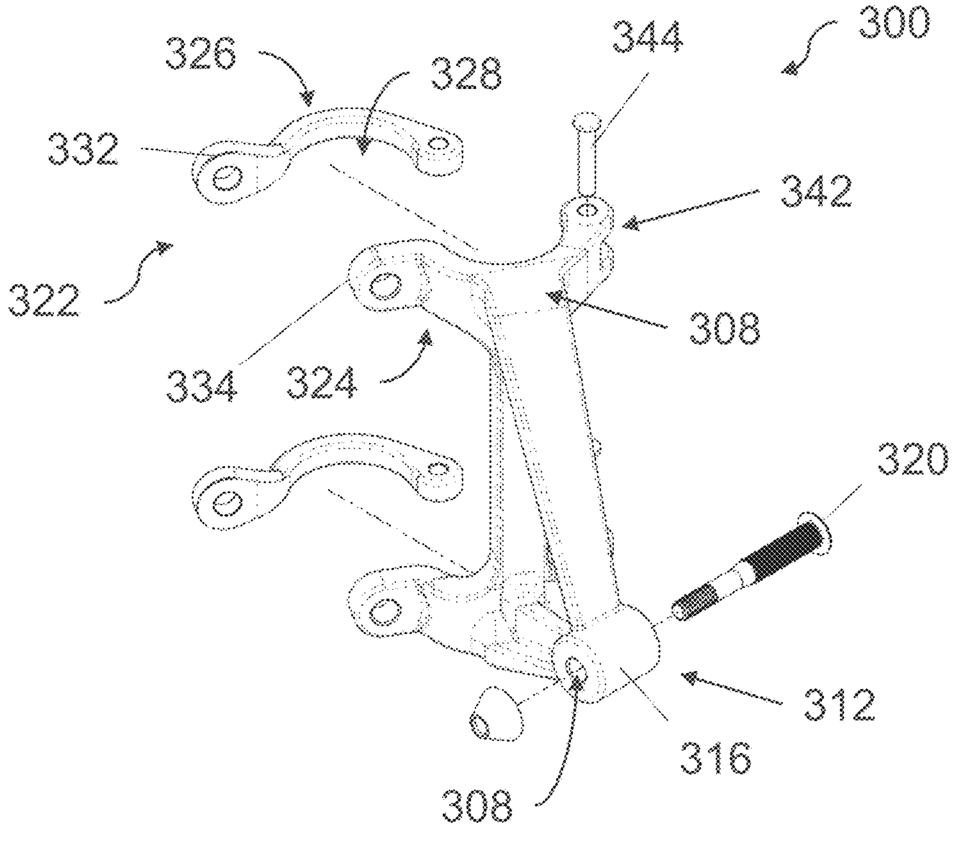
FIG. 22 is an exploded, perspective view of the lower damper mount of FIG. 21.
Figure 23:
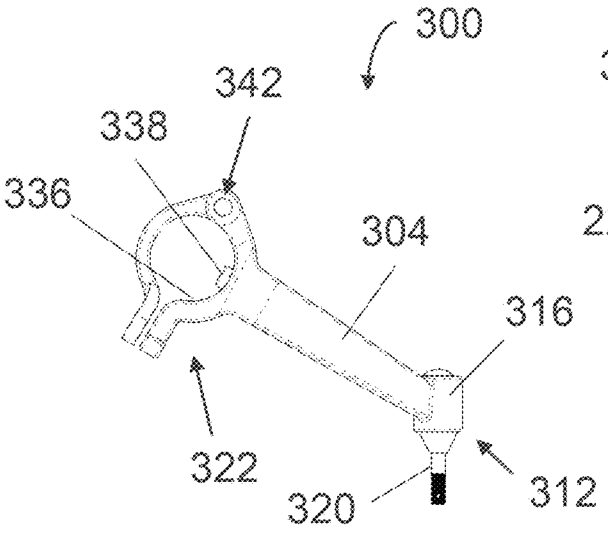
FIG. 23 is a plan view of the lower damper mount of FIG. 21.
Figure 24:
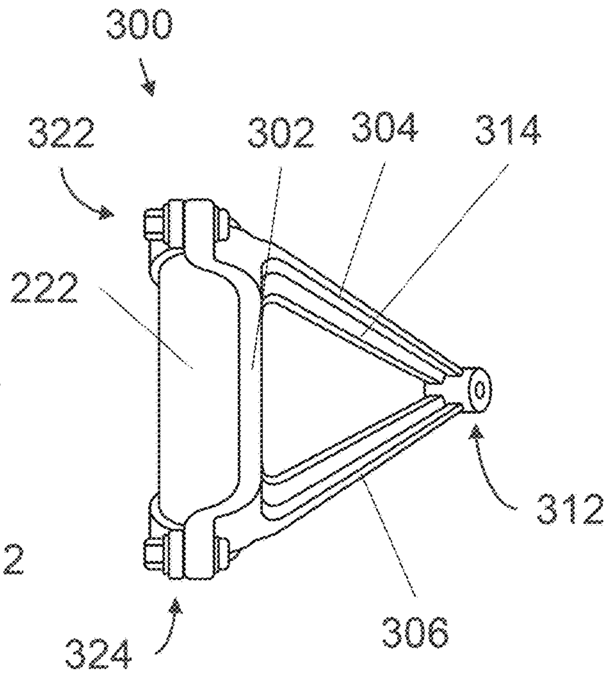
FIG. 24 is a side elevation view of the lower damper mount of FIG. 21 shown coupled to a leg of the pier of FIG. 18.
Figure 25:
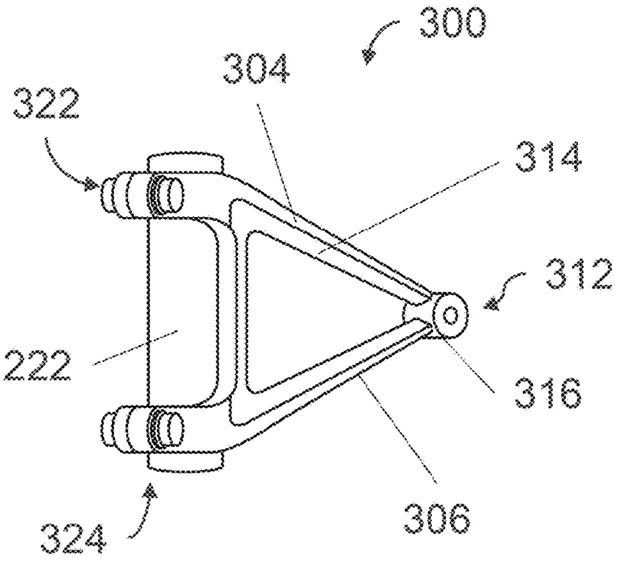
FIG. 25 is a perspective view of the lower damper mount of FIG. 21 shown coupled to a leg of the pier of FIG. 18.
Figure 26:
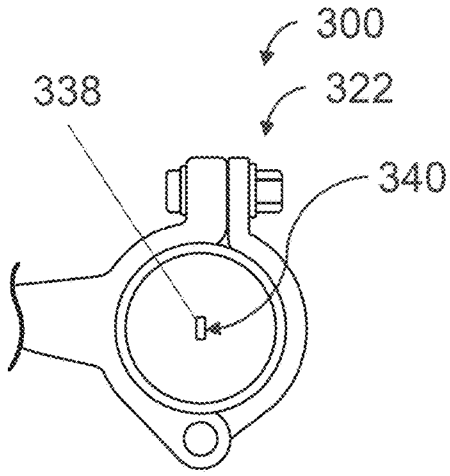
FIG. 26 is a plan, cross-sectional view of a leg of the pier of FIG. 18 shown coupled to the lower damper mount of FIG. 21.
Figure 27:
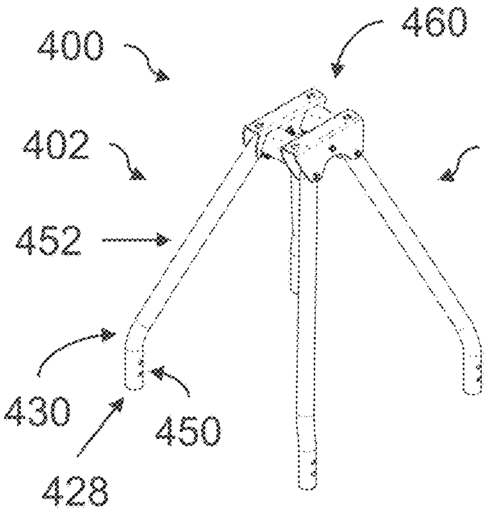
FIG. 27 is a perspective view of yet another embodiment of a pier of the solar tracker of FIG. 1 shown coupled to a bracket provided in accordance with the present disclosure.
Figure 28:
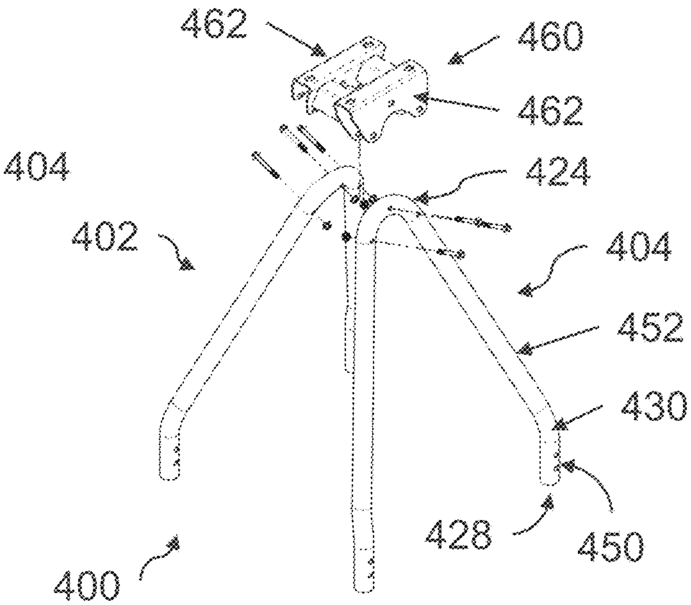
FIG. 28 is an exploded, perspective view of the pier and bracket of FIG. 27.
Figure 29:
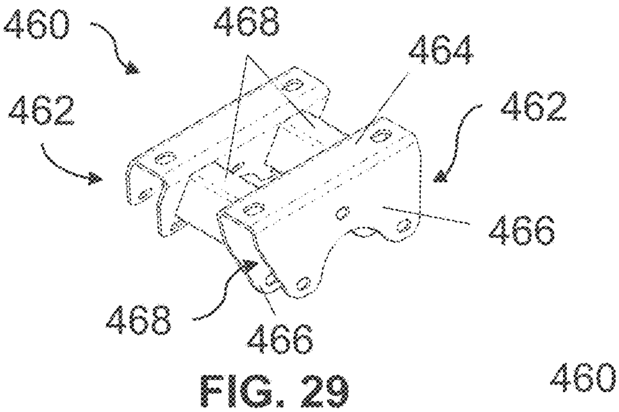
FIG. 29 is a perspective view of the bracket of FIG. 27.
Figure 30:
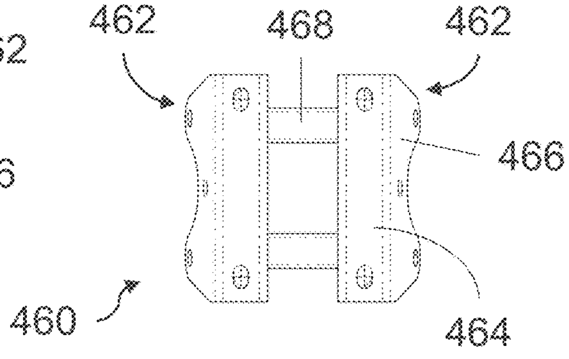
FIG. 30 is a plan view of the bracket of FIG. 27.

The present disclosure is directed to solar tracking systems having piers defining a generally A-shaped profile. The pier may include a crown interposed between a pair of legs having a dog-leg shaped profile along their length. A pivot is disposed on the crown and extends between the pair of legs (e.g., a space bounded by the crown and the pair of legs). The pivot rotatably supports a bearing housing assembly, which in turn, is selectively coupled to a torque tube of the solar tracking system. The bearing housing assembly includes a support bracket that is pivotably supported on the pivot and a torque tube clamp that is selectively coupled to the support bracket. The support bracket and the torque tube clamp cooperate to define a channel for receipt of a torque tube and the torque tube clamp is transitionable from a first, open position where the torque tube is movable relative to the bearing housing assembly to a second, closed or clamped position where the torque tube is inhibited from moving relative to the bearing housing assembly. In this manner, the torque tube is positioned within the space bounded by the crown and the pair of legs of the frame of the pier. In embodiments, the pier may include two bearing housing assemblies disposed on either side of the crown of the frame (e.g., the frame is interposed between the two bearing housing assemblies. To accommodate the bearing housing assembly between the pair of legs, the crown of the frame may include a substantially linear portion extending between the pair of legs. As can be appreciated, the length of the linear portion of the crown may be increased or decreased depending upon the clearance needed for the bearing housing assembly.

In an embodiment, the linear portion of the crown of the frame may define a generally planar profile (e.g., flat or otherwise being thin) where the width of the crown is greater than an outer dimension of the pair of legs of the frame. As can be appreciated, the planar profile of the crown provides a stable support for a bearing housing assembly that is disposed on the upper surface of the crown. It is envisioned that the crown may include one or more slots or bores defined therethrough for receipt of fasteners to selectively couple the bearing housing assembly to the frame.

In embodiments, the pier may support a damper assembly for reducing oscillations or other external loads acting upon the solar modules of the solar tracking system, such as wind loading amongst others. The damper assembly includes a damper support coupled to a pair of dampers that extend between the damper support and an upper damper mount that is operably coupled to the torque tube. The damper support defines a generally U-shaped profile having a linear center portion extending between two opposed elbows. A coupling is coupled to each elbow that defines a generally U-shaped profile defining a channel for receipt of a respective leg of the pair of legs of the frame. Each coupling is oriented at an angle relative to the center portion such that each channel is generally co-linear with a longitudinal axis defined through each respective leg of the pair of legs. To accommodate the pair of dampers, the center portion is offset from the pair of legs to generally align the damper mounting points of the center portion with the damper mounting points of the upper damper mount.

In another embodiment, the pier may include a pair of damper supports coupled to a respective leg of the pair of legs. Each damper mount is constructed in a generally mirrored configuration to the other to accommodate placement of each damper mount on the opposing legs of the frame. The damper mount defines a generally triangular profile defining a first apex, a second apex, and a third apex. A first leg extends between the first apex and the third apex, a second leg extends between the second apex and the third apex, and a third leg extends between the first apex and the second apex. The first, second, and third legs cooperate to define an interior surface that bounds a generally hollow interior portion. In embodiments, a web may be disposed on the inner surface around the entirety of the perimeter or only a portion of the perimeter, depending on the design needs of the damper support.

A first coupling is disposed on the first apex and a second coupling is disposed at the second apex. The first and second couplings define a generally clamshell configuration having a first half section that is hingedly coupled to a second, stationary half section. The first half section is movable from a first, open position for receipt of a leg of the frame and a second, closed or clamped position where the leg is secured or otherwise inhibited from moving relative to the damper support. The first and second couplings of the damper support are configured to be secured to the same leg of the frame. In embodiments, a protuberance may be disposed on an inner surface of the second half section that is configured to be received in a corresponding bore formed through the leg of the frame and inhibit movement of the damper support relative to the frame. The third apex includes a pivot that is configured to rotatably support the damper, which extends between the pivot and an upper damper mount coupled to the torque tube. The damper support is coupled to the leg of the frame in an orientation where the pivot is offset relative to the legs of the frame and generally aligned with damper attachment points disposed on the upper damper mount. It is envisioned that a portion or all of the damper mount may be formed from a 3-D printed material.

In another embodiment, a pair of piers may be coupled to one another using a coupling to provide a support for a slew drive of the solar tracking system. Each pier of the pair of piers defines a first linear section and a second linear section that intersect at an obtuse angle (e.g., forms a lazy-L configuration). The coupling includes a pair of support brackets disposed in spaced relation and a pair of connectors interposed between the pair of support brackets. Each support bracket defines a generally U-shaped profile having a planar upper surface and a pair of legs extended from the upper surface. A channel is defined between the pair of legs for receipt of a crown or other portion of a respective pier. The pair of legs oriented parallel to one another but at an angle relative to the upper surface that is generally complimentary to the angle of the second linear section of the pier. The pair of support brackets are disposed in juxtaposed relation to one another to accommodate the angle of each respective pier that is angled towards one another. The pair of connectors are formed from box tube and are coupled to each of the pair of support brackets. It is envisioned that the pair of connectors may include any suitable profile and in embodiments, the coupling may include any number of connectors depending upon the design needs of the connector.

In some embodiments, the end portions of the legs of the piers may include a cavity for receipt of a portion of a pile having a reduced outer dimension or may define a portion having a reduced outer dimension for receipt within a cavity defined in a pile. As can be appreciated, the pile and the ends of the legs of the piers cooperate to define a slip fit arrangement. The pile extends between a first end portion having the cavity or reduced outer dimension and a second, opposite end portion having a pair of plates. The pair of plates is oriented in a generally X-type configuration, although it is envisioned that any suitable configuration may be employed, and cooperate to aid in maintaining a position of the pile once embedded in the earth (e.g., provide resistance against movement by engaging an increased volume of earth as compared to a pile without any plates). The end portions of the pair of legs of the pier includes a plurality of spaced apart bores extending along a longitudinal axis thereof for receipt of a fastener. The plurality of spaced apart bores of the pier is configured to incrementally align with a corresponding hole defined adjacent the first end portion of the pile. In this manner, a position of the pier relative to the pile (e.g., a height of the pier) can be adjusted by aligning a respective bore of the plurality of bores with the hole of the pile. During installation, once a desired height is obtained, a fastener, such as a bolt, rivet, detent, etc. is advanced within the hole of the pile and the desired bore of the plurality of bores of the pier to secure the pier to the pile. These and other aspects of the present disclosure will be described in further detail herein.

Referring now to the drawings, a solar tracker provided in accordance with the present disclosure is illustrated in FIG. 1 and generally identified by reference numeral 10. The solar tracker 10 includes a plurality of piers 20 disposed in spaced relation to one another and embedded in the earth. A torque tube 12 extends between each adjacent pier 20 and is rotatably supported on each pier 20. The solar tracker 10 includes a plurality of solar panels 14 supported on each respective torque tube 12. The span between two adjacent piers 20 is referred to as a bay 16 and may be generally in the range of about 8 meters in length. A plurality of solar trackers 10 may be arranged in a north-south longitudinal orientation to form a solar array.

The solar tracker 10 includes at least one slew drive 18 operably coupled to the torque tube 12 and supported on a respective pier of the plurality of piers 20. The slew drive 18 effectuates rotation of the torque tube 12, which effectuates a corresponding rotation of the solar panels 14 to track the location of the sun. The solar tracker 10 includes a plurality of bearing housing assemblies (BHA) 40 disposed on respective piers of the plurality of piers 20. Each of the plurality of bearing housing assemblies 40 is operably coupled to the torque tube 12 to rotatably support the torque tube 12 therein as the torque tube 12 is caused to be rotated by the slew drive 18, as will be described in further detail hereinbelow.

With reference to FIGS. 2-6 a pier of the plurality of piers 20 is illustrated. In the interest of brevity, only one pier of the plurality of piers will be described herein. The pier 20 defines a generally "A" shaped profile having a pair of legs 22 and a crown 24 at a center portion thereof. The crown 24 defines a generally planar center portion 26 extending between the pair of legs 22. As can be appreciated, the center portion 26 may include any suitable length (e.g., distance between each of the pair of legs 22) depending upon the design needs of the pier 20. Each leg of the pair of legs 22 extends from the crown 24 and terminates at an end portion 28 disposed in spaced relation from the crown 24. It is envisioned that the pair of legs 22 may include any suitable length (e.g., a distance between the crown 24 and the end portion 28) and each leg of the pair of legs 22 may include the same or different length without departing from the scope of the present disclosure. Each leg of the pair of legs 22 includes a generally dog-leg shape having a bend 30 interposed between the portion of the leg 22 adjacent to the crown 24 and the end portion 28. Each leg of the pair of legs 22 is disposed at an angle relative to the crown 24 such that the pair of legs 22 are splayed (e.g., extend away from one another in a direction towards the bend 30). As can be appreciated, each leg of the pair of legs 22 may define any suitable angle relative to the crown 24 and may define the same or different angles than one another without departing from the scope of the present disclosure. Each leg of the pair of legs 22 transitions from the bend 30 to a generally linear portion 32 in a direction extending away from the crown 24. Although generally illustrated as forming a generally perpendicular angle relative to the crown 24, it is envisioned that linear portions 32 of each leg of the pair of legs 22 may define any suitable angle relative to the crown 24 and may define the same or different angle relative to the crown 24 depending on the design needs of the pier 20. In one non-limiting embodiment, each linear portion 32 of the pair of legs 22 is disposed parallel to one another. In embodiments, the linear portions 32 of the pair of legs 22 may include one or more through-holes or bores 34 defined therethrough for selective receipt of a fastener (e.g., a bolt, a rivet, amongst others) to selectively couple the pier 20 to a pile or other support structure, as will be described in further detail hereinbelow.

A bearing housing support or pivot 36 is disposed on the center portion 26 of the crown and interposed between the pair of legs 22 (e.g., the space formed between the pair of legs 22 and the crown 24). The pivot 36 includes a through-bore 38 defined therethrough that extends transverse to the crown 24 (e.g., along the length of the solar tracker 10). As can be appreciated, the pivot 36 rotatably supports the bearing housing assembly 40 on the pier 20, which in turn, enables rotation of the torque tube 12 effectuated by the slew dive 18. The bearing housing assembly 40 includes a support bracket 42 rotatably supported by the pivot 36 and a torque tube clamp 44 in mechanical communication with the support bracket 42. The support bracket 42 and the torque tube clamp 44 cooperate to define a channel 46 for receipt of the torque tube 12. As can be appreciated, the torque tube clamp 44 is configured to be transitioned between a first, open position, where the torque tube 12 is free to move relative to the bearing housing assembly, and a second, closed or clamped position, where the torque tube clamp 44 secures or otherwise inhibits movement of the torque tube 12 relative to the bearing housing assembly 40. In this manner, when the torque tube clamp 44 is placed in the second, clamped position, the bearing housing assembly 40 and the torque tube 12 rotate in unison about the pivot 36 of the pier 20. The pivot 36 is disposed the crown 24 of the pier 20 to enable the bearing housing assembly 40, and thereby the torque tube 12, to rotate below the crown (e.g., a side of the crown that is towards the end portion 28) or otherwise within a space defined between the pair of legs 22 and the crown 24.

It is envisioned that the pivot 36 may be integrally formed with the pier 20 or may be a separate component that is coupled to the pier 20 using any suitable means, such as welding, adhesives, fasteners, amongst others. In embodiments, the pivot 36 may include a bushing or bearing (not shown) disposed within the through-bore 38 to rotatably support the bearing housing assembly 40.

The pier 20 is formed from a unitary piece (e.g., a length of tube or pipe) that has been bent or otherwise formed into the generally "A" shaped profile, although the pier 20 may be formed from multiple pieces that have been coupled to one another by means of welding, adhesives, fasteners, amongst others without departing from the scope of the present disclosure. Although generally shown as having a circular cross-section, it is contemplated that the pier 20 may include any cross-section, such as square, triangle, oval, racetrack, hexagonal, amongst others, and the pier may include multiple cross-sectional shapes depending upon the design needs of the pier 20. It is envisioned that the pier 20 may be formed from any suitable material, such as metallic, non-metallic, ceramic, amongst others and in embodiments, may include one or more coatings, such as paint, corrosion resistant coatings, amongst others.

Turning to FIGS. 7-13, another embodiment of a pier provided in accordance with the present disclosure is illustrated and generally identified by reference numeral 100. The pier 100 is substantially similar to that of pier 20, except that the linear portion 126 of the crown 124 defines a generally planar or rectangular profile extending between each leg of the pair of legs 122, such that the height (e.g., a direction extending in a direction from the end portion 128 towards the crown 124) of the linear portion 126 is less than a width (e.g., a direction extending transverse to the height) of the linear portion 126. It is envisioned that the linear portion 126 of the crown 124 may include any width and height without departing from the scope of the present disclosure, and in embodiments, may define a square profile, a circular profile, an oval profile, amongst others.

The linear portion 126 of the crown includes a pair of slots 150 formed therethrough extending in a direction extending from the end portion 128 towards the crown 124 and disposed in spaced relation to one another. In this manner, a first slot of the pair of slots 150 is disposed adjacent a first leg of the pair of legs 122 and a second slot of the pair of slots 150 is disposed adjacent a second, opposite leg of the pair of legs 122. Each slot of the pair of slots 150 extends in a direction that is transverse to a longitudinal axis A-A defined through the length of the linear portion 126 (e.g., across a width of the linear portion 126). The pair of slots 150 is configured to receive a fastener or other suitable coupling means to couple the bearing housing assembly 40 to the linear portion 126. In embodiments, one or both slots of the pair of slots 150 may be oriented parallel to the longitudinal axis A-A. Although generally illustrated as having a pair of slots 150, it is contemplated that the linear portion 126 may include any number of slots 150 or bores defined therethrough depending upon the design needs of the pier 100. It is envisioned that the linear portion 126 of the crown 124 may be formed using any suitable method, such as stamping, hydroforming, amongst others, and the linear portion 126 may be an integral (e.g., formed as a unitary piece) part of the pier 120 or may be a separate component that is coupled to the pair of legs 122 using any suitable means, such as fasteners, adhesives, welding, amongst others.

With reference to FIGS. 14-17, yet another embodiment of a pier provided in accordance with the present disclosure is illustrated and generally identified by reference numeral 200. The pier 200 is substantially similar to that of pier 20, except that the crown 224 defines a generally arcuate profile (e.g., a semi-circular) profile extending between each leg of the pair of legs 222. As can be appreciated, the crown 224 may include any suitable radius and length without departing from the scope of the present disclosure.

A support bracket 260 is operably coupled to the crown 224 of the pier 200 and is configured to support a bearing housing assembly 40 thereon. The support bracket 260 defines a generally U-shaped or saddle profile defining a channel (not shown) therebetween that is configured to receive a portion of the crown 224 therein. The support bracket 260 is coupled to the crown 224 using any suitable means, such as fasteners, welding, adhesives, amongst others.

A damper support 270 is operably coupled to each leg of the pair of legs 222 of the pier 200 and is configured to operably support one or more dampers 292 of a damper assembly 290. The damper support 270 includes a support tube 272 extending between a pair of coupling plates 274. The support tube 272 defines a generally U-shaped profile having a linear center portion 276 interposed between a pair of elbows or arcuate legs 278. The support tube 272 includes one or more attachment points 280 disposed on or defined therein for coupling a damper 292 of the damper assembly 290. It is envisioned that the attachment points 280 may be through-holes, threaded bores, bosses, or threaded bosses that are configured to selectively couple the damper 292 to the support tube 272 using any suitable means, such as fasteners or the like.

Each elbow of the pair of elbows 278 intersect the linear center portion 276 at an angle such that a distance between the pair of elbows 278 increases as the pair of elbows extend away from the linear center portion (e.g., each elbow of the pair of elbows 278 define an oblique angle (greater than 90 degrees) relative to the linear center portion). Each coupling plate of the pair of coupling plates 274 defines a generally U shaped profile and is configured to receive a portion of a leg of the pair of legs 222 within an open portion thereof (e.g., the interior of the "U" shape). In this manner, each coupling plate of the pair of coupling plates 274 is oriented relative to the support tube that generally corresponds to the angle defined by each leg of the pair of legs 222 relative to one another (e.g., a longitudinal axis of the each plate of the pair of coupling plates 274 is disposed generally parallel to or co-linear with an axis defined by each respective leg of the pair of legs 222). It is envisioned that each coupling plate of the pair of coupling plates 274 may be coupled to a respective leg of the pair of legs 222 of the pier 200 using any suitable means, such as fasteners, welding, adhesives, amongst others.

As can be appreciated, the length of the support tube 272 of the damper support 270 (e.g., a distance extending between the pair of elbows 278) defines the position at which the damper support 270 is disposed on each of the legs of the pair of legs 222. In this manner, a position at which the damper support 270 is disposed between the end portion 228 of the pair of legs 222 and the crown 224 can be altered to accommodate a length of a damper 292 of a damper assembly 290, as will be described in further detail hereinbelow.

The damper assembly 290 includes a pair of dampers 292 and an upper damper mount 294. The upper damper mount 294 includes an elongate body extending between a first wing 296 and an opposite second wing 298. In this manner, the upper damper mount 294 defines a generally arcuate or boomerang type configuration, although it is contemplated that the upper damper mount 294 may define any suitable configuration without departing from the scope of the present disclosure. In one non-limiting embodiment, each of the first and second wings 296, 298 form an angle ∝_2 of 15-degrees with respect to a longitudinal axis extending through the first and second wings 296, 298, although it is contemplated that any suitable angle may be formed relative to the longitudinal axis.

The upper damper mount 294 includes a groove or channel 300 interposed between the first and second wings 296, 298 and extending transverse to the longitudinal axis of the upper damper mount 294. The channel 300 is configured to receive the torque tube 12 therein such that the torque tube 12 may be selectively coupled to the upper damper mount 294 an inhibit movement of the torque tube 12 relative to the upper damper mount 294. In this manner, rotation of the torque tube 12 effectuates a corresponding rotation of the upper damper mount 294. It is envisioned that the upper damper mount 294 may be coupled to the torque tube 12 using any suitable means, such as fasteners, welding, adhesives, amongst others. The upper damper mount 294 includes a first post 302 disposed on the first wing 296 and a second post 304 disposed on the second wing 298, each extending transverse to the longitudinal axis of the upper damper mount 294. The first and second posts 302, 304 are configured to be coupled to a respective damper 292 of the damper assembly 290 using any suitable means, such as fasteners, welding, adhesives, amongst others. In one non-limiting embodiment, one or both of the first and second posts 302, 304 is a bolt coupled to the upper damper mount 294.

Turning to FIGS. 18-26, another embodiment of damper support is illustrated and generally identified by reference numeral 300. The damper support 300 defines a generally triangular shaped profile having a base 302, a first leg 304, and a second leg 306 intersecting at respective first, second, and third vertices 308, 310, and 312. In this manner, the base 302 and the first leg 304 intersect at the first vertex 308, the base and the second leg 306 intersect at the second vertex 310, and the first and second legs 304, 306 intersect at the third vertex 312. Although generally described as having a triangular profile, it is envisioned that the damper support 300 may include any suitable profile without departing from the scope of the present disclosure. In embodiments, one or all of the base 302, the first leg 304, and the second leg 306 may have a web 314 extending towards an interior portion of the damper support 300. As can be appreciated, the web 314 may include any suitable thickness, height, length, etc. depending upon the design needs of the damper mount 300.

A post or pivot 316 is disposed at the third vertex 312 and includes a through-bore 318 (FIG. 22) defined therethrough for receipt of a pivot fastener 320. Although generally described as being received within the through-bore 318, it is envisioned that the pivot fastener 320 may be integrally formed with the pivot 316 (e.g., machined, molded, 3-D printed, amongst others) or may be joined to the pivot 316 using any suitable means, such as welding, fasteners, adhesives, amongst others. The pivot 316 is configured to be selectively coupled to a portion of a respective damper 292 of a damper assembly 290 such that the damper 292 is coupled to the upper damper mount 294 at a first end portion thereof and to the pivot 316 of the damper mount 300 at a second, opposite end portion thereof. In this manner, rotation of the torque tube 12 effectuates a corresponding rotation of the upper damper mount 294, which causes the damper 292 to compress or extend between the upper damper mount 294 and the pivot 316, depending upon the direction of rotation of the torque tube 12.

With continued reference to FIGS. 18-26, the damper mount 300 includes a first clamp assembly 322 disposed adjacent the first vertex 308 and a second clamp assembly 324 disposed adjacent the second vertex 310. Each of the first and second clamp assemblies 322, 324 are substantially similar to one another and therefore only the first clamp assembly 322 will be described herein in the interest of brevity. The first clamp assembly 322 defines a generally clamshell configuration having a first half-section 324 rotatably coupled to a second half-section 326. The first half-section 324 is coupled to the first vertex 308 such that the second half-section 326 rotates relative to the first half-section 324 and the remainder of the damper mount 300. Although generally illustrated as being integrated into the first vertex 308 (e.g., formed from the same component via machining, molding, 3-D printing, amongst others), it is envisioned that the first half-section 324 may be a separate component from the first vertex 308 and may be coupled to the first vertex 308, the base, 302, or first leg 304 using any suitable means, such as fasteners, welding, adhesives, amongst others.

Each of the first and second half-sections 324, 326 include a generally tubular center portion defining a channel 328 interposed between a planar tab portion 330 and 332, respectively. The planar tab portions 330, 332 of the first and second half-sections 324, 326 cooperate to enable the first and second half-sections 324, 326 to be clamped together or otherwise maintained in a clamped or closed position using fasteners, welding, adhesives, amongst others. In embodiments, an interior surface 336 of the first half-section 324 may include a boss or protuberance 338 (FIG. 23) disposed thereon and extending into the channel 328. As will be appreciated, the protuberance 338 is configured to be received in a corresponding bore 340 (FIG. 26) defined through each leg of the pair of legs 222 to lock or otherwise inhibit movement (e.g., rotation, translation, etc.) of the damper mount 300 relative to the leg 222.

Each of the first and second half-sections 324, 326 is hingedly coupled to one another using a hinge 342 or other suitable formation (e.g., a plurality of interlocking cylinders) including a hinge pin 344 (FIG. 21) selectively retained therein to enable relative motion of the first and second half-sections 324, 326 from a first, open configuration, to the second clamped or closed configuration. In one non-limiting embodiment, the hinge pin 344 is a bolt including a nut, although it is contemplated that any suitable means may be utilized to hingedly couple the first and second half-sections 324, 326 to one another.

Turning to FIGS. 27-31A, another embodiment of a pier provided in accordance with the present disclosure is illustrated and generally identified by reference numeral 400. The pier 400 includes a first A-frame 402, a second A-frame 404, and a coupling 460 for coupling the first A-frame 402 to the second A-frame 404.

Each of the first and second A-frames 402, 404 is substantially similar to one another and substantially similar to the pier 200 and therefore, only the differences therebetween will be described herein in the interest of brevity. The first A-frame 402 defines a first linear section 450 extending from the end portion 428 to the bend 430 and a second linear section 452 extending from the bend 430 and extending towards, and including, the crown 424. The first and second linear sections 450, 452 intersect one another at the bend 430 and form an obtuse angle (e.g., less than 180 degrees relative to one another). In this manner, the first A-frame 402 defines a generally lazy "L" or reclined shape. Although generally described as defining an obtuse angle, it is envisioned that the first and second linear sections 450, 452 may define any suitable angle relative to one another without departing from the scope of the present disclosure.

Figure 31:
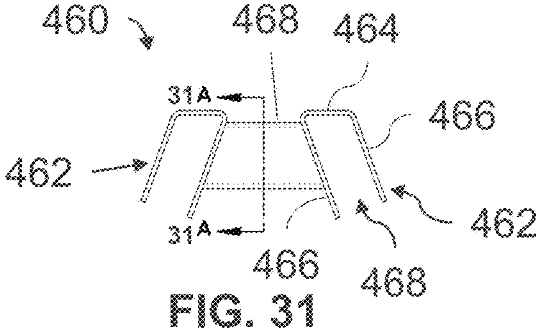
FIG. 31 is a side elevation view of the bracket of FIG. 27.
Figure 31A:
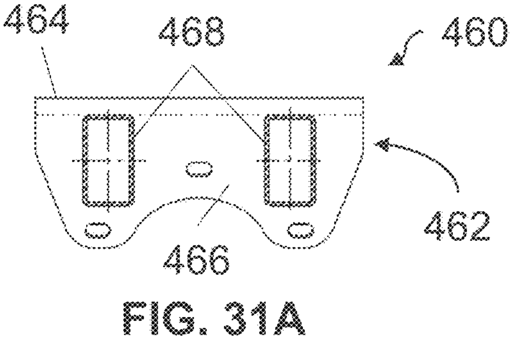
FIG. 31A is a cross-sectional view of the bracket of FIG. 27 taken along section line 31A-31A.
Figure 32:
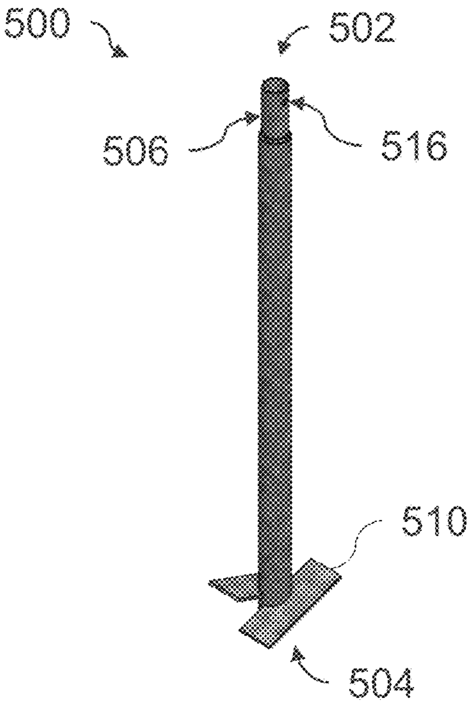
FIG. 32 is a perspective view of a pile provided in accordance with the present disclosure.

The coupling 460 includes a pair of support brackets 462 coupled to a pair of connectors 468 interposed between each support bracket of the pair of support brackets 462. Each support bracket of the pair of support brackets 462 is substantially similar to one another and therefore only one support bracket 462 will be described in detail herein in the interest of brevity. The support bracket 462 defines a generally inverted U-shaped or saddle configuration defining an upper surface 464 and a pair of legs 466 extending from the upper surface 464. Each leg of the pair of legs is disposed in spaced relation to one another and defining a channel 468 therebetween for receipt of a portion of the crown 424, or other suitable portion, of a respective A-frame of the first and second A-frames 402, 404. The pair of legs 466 are oriented parallel to one another and form an angle relative to the upper surface 464 (e.g., a rhombus type shape) that is generally complimentary to the angle of the second linear section 452 of the first and second A-frames 402, 404. In this manner, the upper surface 464 is maintained in a generally horizontal orientation (e.g., substantially parallel to a longitudinal axis defined by the torque tube 12). The pair of support brackets 462 are oriented in a mirrored configuration, such that the angle formed by the pair of legs 466 of each of the pair of support brackets 462 is oriented towards one another (e.g., non-parallel and intersecting above the upper surface 464). In this manner, the channel 468 of each support bracket of the pair of support brackets 462 is oriented to substantially correspond to the second linear section 452 of a respective first or second A-frame (FIG. 31). It is contemplated that each support bracket of the pair of support brackets 462 may be formed from any suitable material (e.g., metals, polymers, composites, amongst others), may be formed using any suitable process (e.g., stamping, hydroforming, bending, machining, amongst others), and may be formed from the same or different material or be formed by the same or different process.

Each connector of the pair of connectors 468 is interposed between the pair of support brackets 462 and defines a generally rectangular profile that extends linearly between, and is coupled to, each support bracket of the pair of support brackets. Although generally described as defining a rectangular profile that extends linearly, it is envisioned that the pair of connectors 468 may define any suitable profile (e.g., square, circular, oval, hexagonal, amongst others) or extend along any suitable path between the pair of support brackets (e.g., arcuate, curvilinear, amongst others without departing from the scope of the present disclosure. In one non-limiting embodiment, the pair of connectors 468 is formed from rectangular box tubing (e.g., hollow box tubing). Although generally illustrated as being disposed in spaced relation to one another and oriented substantially parallel to one another (e.g., substantially orthogonal to the pair of support brackets 462), the pair of connectors 468 may be disposed at any location and oriented at any angle relative to each other and the pair of support brackets 462 without departing from the scope of the present disclosure. Although generally described as having a pair of connectors 468, it is envisioned that the coupling 460 may include any suitable number of connectors 468 depending upon the design needs of the coupling 460. The coupling 460 is fixedly or selectively coupled to each of the pair of A-frames using any suitable means, such as fasteners, welding, adhesives, amongst others. As can be appreciated, the coupling 460 provides a secure base upon which a slew drive 18 can be supported.

With reference to FIGS. 32-40, a pile for use with a pier is provided in accordance with the present disclosure and generally identified by reference numeral 500. The pile 500 extends between a first end portion 502 and a second, opposite end portion 504. The pile 500 extends substantially linearly between the first end portion 502 and the second end portion 504 and defines a generally circular cross-section, although it is envisioned that the pile 500 may define any suitable path between the first and second end portions 502, 504 (e.g., arcuate, curvilinear, combinations thereof, amongst others) and may define any suitable cross-section (e.g., square, rectangular, triangular, hexagonal, combinations thereof, amongst others. In one non-limiting embodiment, the pile 500 is formed from a hollow tube having a circular cross-section. The pile 500 includes a reduced portion 506 extending from the first end portion 502 and partway towards the second end portion 504 and defining an outer dimension that is less than the outer dimension of the remainder of the pile 500. It is envisioned that the reduced portion 506 may include any suitable length and may include any suitable outer dimension or profile without departing from the scope of the present disclosure.

The pile 500 includes a pair of plates 510 disposed thereon adjacent the second end portion 504. Each plate of the pair of plates 510 defines a generally planar configuration and is disposed in juxtaposed relation to one another (e.g., on either side of the pile 500). Although generally illustrated as being disposed in an X-shaped configuration, it is envisioned that the pair of plates 510 may be disposed in any suitable configuration and each plate of the pair of plates may define any suitable profile (e.g., linear, arcuate, curvilinear, amongst others) and may be the same or different than one another. It is contemplated that the pile may include any suitable number of plates 510, including no plates 510, and the plates 510 may be disposed at any location along the length of the pile 510 without departing from the scope of the present disclosure. The pair of plates 510 is coupled to the pile 510 using any suitable method, such as fasteners, welding, adhesives, amongst others. As can be appreciated, the pair of plates 510 aid in maintaining a position of the pile 510 once embedded in the earth (e.g., provide resistance against movement by engaging an increased volume of earth as compared to a pile 510 without any plates 510).

Figure 33:
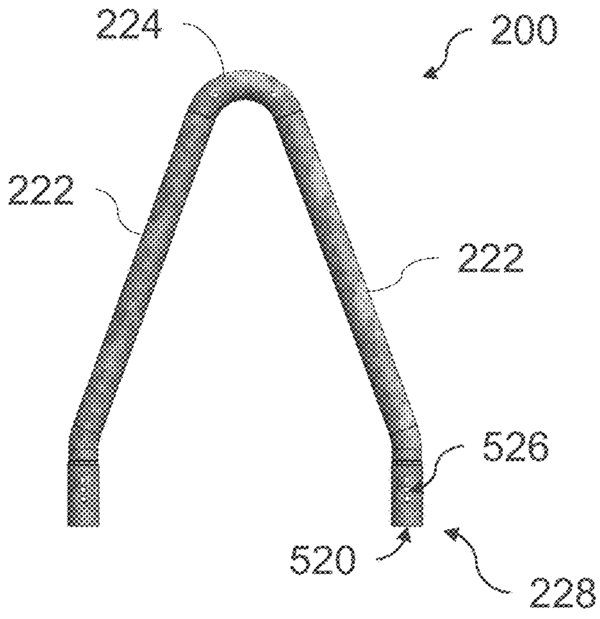
FIG. 33 is a front elevation view of another embodiment of a pier of the solar tracker of FIG. 1 provided in accordance with the present disclosure.
Figure 34:
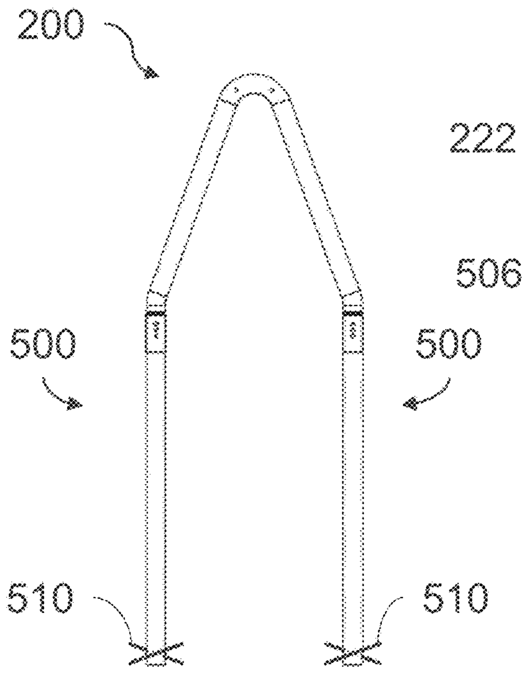
FIG. 34 is a front elevation view of the pile of FIG. 32 shown coupled to the pier of FIG. 33.

With reference to FIG. 33, the pile 510 is configured to be selectively coupled to any suitable pier, and in one non-limiting embodiment, is configured to be selectively coupled to the pier 200. The pier 200 defines a cavity 520 extending through each respective end portion 228 of the pair of legs 222 to slidably receive the reduced portion 506 of the pile 500. In this manner, the cavity 520 includes an inner dimension that forms a slip fit between the reduced portion 506 of the pile and the cavity 520 of the pier 200. In embodiments where the pair of legs 222 of the pier 200 are formed from a hollow tube, the outer dimension of the reduced portion 506 of the pile may be less than the inner dimension of the hollow tube, or the end portion 228 of the leg 222 of the pier 200 may be swaged or otherwise enlarged to accommodate the reduced portion 506 of the pile. In embodiments, with reference to FIGS. 37-40, the pair of legs 222 of the pier 200 may define a reduced portion 524 adjacent to the end portion 228 and the pile 500 may define a cavity 512 or enlarged portion 514 adjacent the first end portion 502 (e.g., opposite to the configuration illustrated in FIGS. 32-36). It is envisioned that any combination of reduced portions and enlarged portions may be utilized without departing from the scope of the present disclosure.

Figure 35:
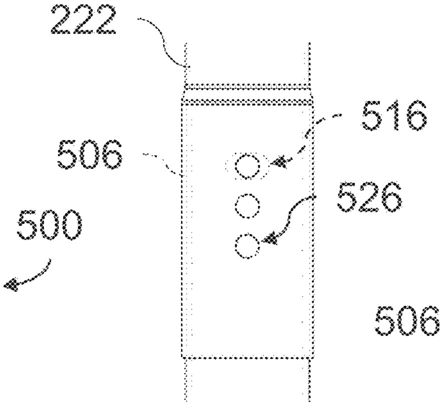
FIG. 35 is a front elevation view of the pile of FIG. 32 advanced within the pier of FIG. 33 to a first position.
Figure 36:
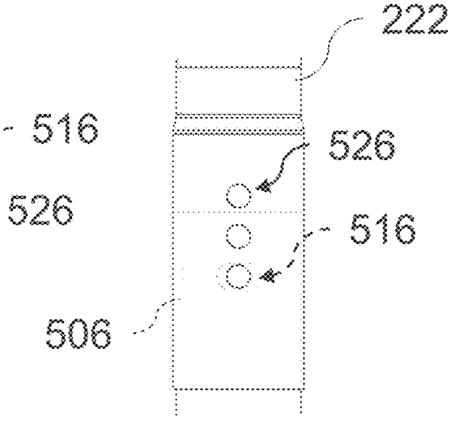
FIG. 36 is a front elevation view of the pile of FIG. 32 advanced within the pier of FIG. 33 to a second position.
Figure 37:
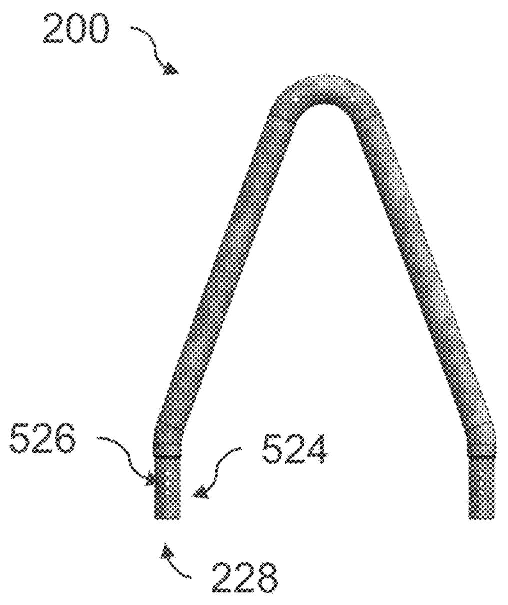
FIG. 37 is a front elevation view of yet another embodiment of a pier of the solar tracking system of FIG. 1.
Figure 38:
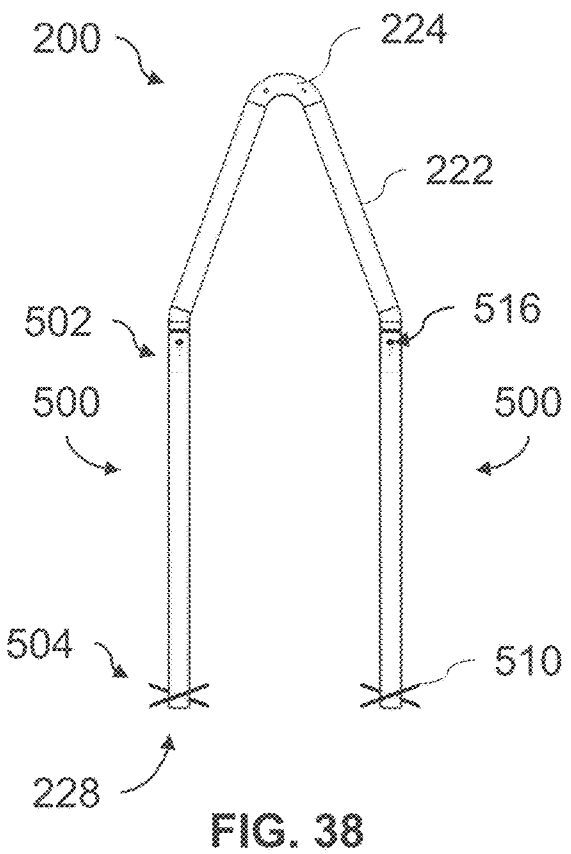
FIG. 38 is a front elevation view of the pier of FIG. 37 shown coupled to another embodiment of a pile provided in accordance with the present disclosure.
Figure 39:
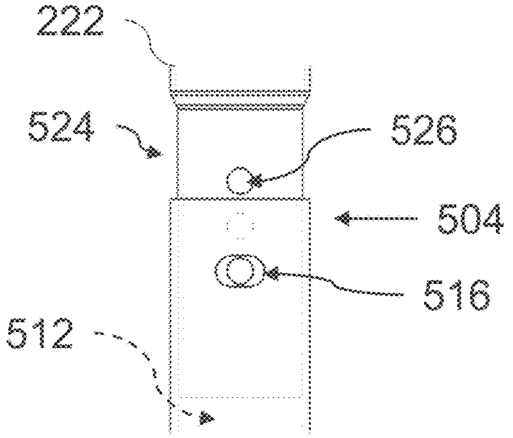
FIG. 39 is a front elevation view of a leg of the pier of FIG. 37 advanced within the pile of FIG. 38 to a first position.
Figure 40:
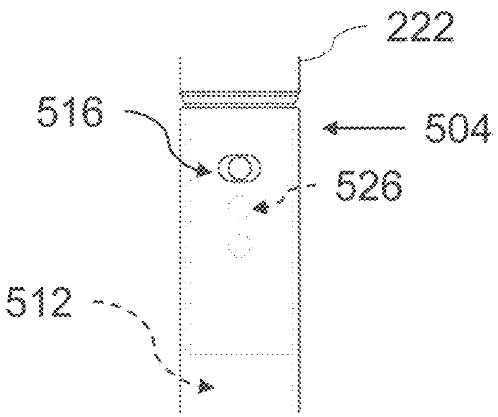
FIG. 40 is a front elevation view of the leg of the pier of FIG. 37 advanced within the pile of FIG. 38 to a second position.

With reference to FIGS. 35 and 36, a plurality of bores 526 is defined through each leg of the pair of legs 222 of the pier 200 adjacent the end portion 228. The plurality of bores 526 is disposed in spaced relation longitudinally along each of pair of legs 222. As can be appreciated, the plurality of bores 526 is configured to align with a corresponding hole 516 defined through the reduced portion 506 of the pile 500 to selectively or fixedly couple the pile 500 to the pier 200. Although generally illustrated as having a racetrack configuration, it is envisioned that the hole 516 may have any suitable configuration and may be configured to accommodate misalignment between the hole 516 and one or more of the plurality of bores 526. The spaced apart configuration of the plurality of bores 526 provides a corresponding plurality of locations at which a fastener can be received within a bore of the plurality of bores 526 and the hole 516 of the pile 500, increasing (FIG. 36) or decreasing (FIG. 35) an overall height of the pier 200 relative to the ground (e.g., increasing or decreasing a distance between the crown 224 and the pile 500). In this manner, the height of each individual pier 200 within the solar tracker system 10 may be adjusted to accommodate differing heights of piles or the like. It is envisioned that the pier 200 may be coupled to the pile 500 using any suitable means, such as bolts, rivets, welding, adhesive, detents, amongst others.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A solar tracker support system comprising:

a pier comprising an A-frame that includes a pair of legs and a crown extending between the pair of legs;

a pivot disposed at the crown and interposed between the pair of legs; and a bearing housing assembly comprising a first support bracket disposed at a first side of the A-frame and a second support bracket disposed at a second, opposite side of the A-frame, wherein the first support bracket and the second support bracket are rotatably supported by the pivot such that the first support bracket and the second support bracket are rotatable relative to the A-frame, and wherein the first support bracket is configured to support at least one solar module at a top of the first support bracket at the first side of the A-frame and the second support bracket is configured to support at least one solar module at a top of the second support bracket at the second side of the A-frame.

2. The system of claim 1, wherein the pivot comprises a bore extending transverse to the crown and a bearing rotatably disposed at the bore.

3. The system of claim 2, wherein the bearing extends coaxial with the bore and transverse to the crown.

4. The system of claim 1, wherein the first support bracket comprises a first bearing receipt bore at a central portion of the first support bracket, wherein the second support bracket comprises a second bearing receipt bore at a central portion of the second support bracket, and wherein the bearing extends from the first bearing receipt bore, transverse to the crown and between the pair of legs, and to the second bearing receipt bore.

5. The system of claim 4, wherein the bearing hangs below the crown.

6. The system of claim 5, wherein the first support bracket is configured to hang a torque tube from a bottom of the first support bracket at the first side of the A-frame, and wherein the second support bracket is configured to hang the torque tube from a bottom of the second support bracket at the second side of the A-frame.

7. A solar tracker support system comprising:

a pier;

a pivot disposed at the pier; and a bearing housing assembly comprising a first support bracket disposed at a first side of the pier and a second support bracket disposed at a second, opposite side of the pier, wherein the first support bracket and the second support bracket are rotatably supported by the pivot such that the first support bracket and the second support bracket are rotatable relative to the pier, wherein the bearing housing assembly further comprises a first torque tube clamp attached to the first support bracket at the first side of the pier and a second torque tube clamp attached to the second support bracket at the second side of the pier.

8. The system of claim 7, wherein the first support bracket is configured to support at least one solar module at a top of the first support bracket at the first side of the pier and the second support bracket is configured to support at least one solar module at a top of the second support bracket at the second side of the pier, wherein the first support bracket and the first torque tube clamp collectively define a first channel configured for receipt of a torque tube at the first side of the pier, and wherein the second support bracket and the second torque tube clamp collectively define a second channel configured for receipt of the torque tube at the second side of the pier.

9. The system of claim 8, wherein the first and second torque tube clamps are configured to fix the torque tube in place at the first and second support brackets such that as the torque tube is rotated relative to the pier each of the first and second support brackets rotate with the torque tube relative to the pier.

10. The system of claim 9, wherein each of the first and second torque tube clamps are configured to transition between a first, open position at which the torque tube is free to move relative to the bearing housing assembly and a second, closed position at which each of the first and second torque tube clamps inhibit movement of the torque tube relative to the bearing housing assembly.

11. The system of claim 1, wherein the crown comprises a central portion disposed between the pair of legs, and wherein the central portion comprises a planar profile extending at least in a direction between the pair of legs.

12. The system of claim 1, wherein the first support bracket is configured to receive and support a first solar module at the first side of the pier, and wherein the second support bracket is configured to receive and support a second solar module at the second side of the pier.

13. The system of claim 1, wherein at least the pivot, the first support bracket, and the second support bracket are integrated across the A-frame.

14. The system of claim 1, wherein each leg of the pair of legs comprises a first linear end portion at one end of the leg, a second linear end portion at another opposite end of the leg, and a bend between the first linear end portion and the second linear end portion.

15. The system of claim 14, wherein each leg of the pair of legs is disposed at a non-zero angle relative to the crown such that the pair of legs extend away from one another moving in a direction along each leg away from the crown.

16. The system of claim 14, wherein the first linear end portion comprises one or more bores configured to receive one or more fasteners to attach the leg to a ground embedded support.

17. A solar tracker support system comprising:

a torque tube extending along a row of a solar tracker;

an A-frame extending from ground to rotatably support the torque tube relative to ground, the A-frame including a pair of legs and a crown extending from a top of a first leg of the pair of legs to a top of a second leg of the pair of legs;

a pivot bearing rotatable relative to the A-frame and interposed between the pair of legs; and a bearing housing assembly comprising a first support bracket disposed at a first side of the A-frame and a second support bracket disposed at a second, opposite side of the A-frame, wherein the first support bracket and the second support bracket are supported by the pivot bearing and rotatable with the pivot bearing relative to the A-frame, and wherein the first support bracket is configured to support at least one solar module at a top of the first support bracket at the first side of the A-frame and the second support bracket is configured to support at least one solar module at a top of the second support bracket at the second side of the A-frame.

18. The system of claim 17, wherein the first support bracket is configured to hang the torque tube from a bottom of the first support bracket at the first side of the A-frame, and wherein the second support bracket is configured to hang the torque tube from a bottom of the second support bracket at the second side of the A-frame.

19. The system of claim 18, wherein the first support bracket comprises a first bearing receipt bore at a central portion of the first support bracket, wherein the second support bracket comprises a second bearing receipt bore at a central portion of the second support bracket, and wherein the pivot bearing extends from the first bearing receipt bore, transverse to the crown and between the pair of legs, and to the second bearing receipt bore.

20. The system of claim 17, wherein the bearing housing assembly further comprises a first torque tube clamp attached to the first support bracket at the first side of the A-frame and a second torque tube clamp attached to the second support bracket at the second side of the A-frame, and wherein the first support bracket and the first torque tube clamp collectively define a first channel configured for receipt of the torque tube at the first side of the A-frame, and wherein the second support bracket and the second torque tube clamp collectively define a second channel configured for receipt of the torque tube at the second side of the A-frame.

* * * * *